United States Patent Office 3,133,108
Patented May 12, 1964

3,133,108
NITROGEN COORDINATED SILICON
COMPOUNDS
Arnold B. Finestone, West Newton, Mass., assignor to
Westinghouse Electric Corporation, East Pittsburgh,
Pa., a corporation of Pennsylvania
No Drawing. Filed July 29, 1958, Ser. No. 751,632
4 Claims. (Cl. 260—448.2)

This invention relates to certain nitrogen coordinated silicon compounds and to their method of preparation.

The object of this invention is to provide nitrogen coordinated silicon compounds resulting from the reaction of alkanolamines and certain organosilicon compounds.

Another object of this invention is to provide a method of producing nitrogen coordinated silicon compounds by the reaction of alkanolamines and certain organosilicon compounds.

Other objects of this invention will, in part, be obvious and will, in part, appear hereinafter. For a better understanding of the nature and objects of this invention, reference should be had to the following detailed description.

Broadly, in the attainment of the foregoing objects and in accordance with this invention, there is provided a process for preparing certain nitrogen coordinated silicon compounds which comprises admixing an alkanolamine and a partially or completely esterified organosilicon compound, heating the admixture to reflux, refluxing the admixture until a predetermined amount of monohydric alcohol is removed, and recovering the nitrogen coordinated silicon compound. The monohydric alcohol that is removed is one of the products of the reaction, and the nitrogen coordinated silicon compound that is subsequently recovered is the other reaction product. It has been found that the nitrogen coordinated silicon compound prepared in accordance with this invention may comprise the monomer or a low molecular weight polymer thereof, such, for example, as the dimer or trimer.

The organosilicon compounds employed in this invention are those that have the formula $$(R)_n\text{—Si—}(OR')_m$$

wherein $n$ is 0, 1, 2 or 3 and $m$ is 1, 2, 3 or 4; and the total of $n$ and $m$ is 4. R and R' may be alkyl radicals including, for example, methyl, ethyl, propyl, isopropyl, butyl and isobutyl; or aryl radicals including, for example, phenyl, benzyl, methyl phenyl and chlorophenyl.

Table I below lists several specific examples of organosilicon compounds that may be employed in carrying out this invention. It will be noted that these examples fall within the above formula and they are grouped under the various values that have been given to $n$ and $m$ above.

The alkanolamines, also referred to an aminoalcohols, are selected from the group consisting of mono-, di-, and tri-alkanolamines in which the radicals attached to the nitrogen comprise at least one alkanol radical and the balance, if any, are radicals selected from the group consisting of the hydrogen radical, alkyl radicals, cycloalkyl radicals and aryl radicals.

Table II below sets forth examples of some of the alkanolamines that may be employed in carrying out this invention.

TABLE II

*Alkanolamines*

| Mono- | Di- | Tri- |
|---|---|---|
| Mono-ethanolamine. Mono-isopropanol-amine. N, N-diethyl ethanolamine. N, N-diphenyl ethanolamine. N, N-dimethyl isopropanolamine. | Diethanolamine. Diisopropanolamine. N-methyl diethanol-amine. N-ethyl diethanol-amine. N-phenyl diethanol-amine. N-methyl diiso-propanolamine. | Triethanolamine. Triisopropanol-amine. |

The mono-, di- and tri-ethanolamine and isopropanol amines may be represented by the formula

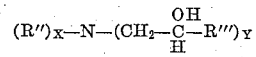

wherein X is 0, 1 or 2 and Y is 1, 2 or 3; and the total of X and Y is 3. R" may be the hydrogen radical; alkyl radicals including, for example, methyl, ethyl, propyl and isopropyl; or aryl radicals including, for example, phenyl, methyl phenyl and chlorophenyl. R''' may be the hydrogen radical or the methyl radical.

In carrying out the process of this invention, there are reacted from one mol to two mols of the alkanolamine and one mol of the organosilicon compound. In practice, however, it is desirable, in order to produce selected compounds, that either precisely one mol or two mols of alkanolamine be employed for each mol of the organosilicon compound. Any excess of alkanolamine employed above two mols will only necessitate its removal after the reaction is completed. As will be noted in the specific examples that follow, different compounds will result depending upon the molar ratio of reactants employed.

The desired amount of reactants is placed in a suitable reaction vessel where they are thoroughly admixed and heated to reflux. Reflux is continued until a predetermined amount of monohydric alcohol, one of the products of the reaction, is removed. The nitrogen coordinated silicon reaction product is then recovered. The nitrogen coordinated silicon compound will be a crystalline solid or a liquid depending on the reactants employed. The crystalline solid compound may be purified by recrystallization from a solvent or by other conventional means, if desired.

TABLE I

*Organosilicon Compounds Having the Formula*

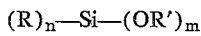

| n=0 m=4 | n=1 m=3 | n=2 m=2 | n=3 m=1 |
|---|---|---|---|
| methyl orthosilicate ethyl orthosilicate propyl orthosilicate 2-ethylbutyl orthosilicate | methyltriethoxysilane ethyltriethoxysilane propyltriethoxysilane ethyltrimethoxysilane phenyltriethoxysilane | dimethyldimethoxysilane dimethyldiethoxysilane diethyldiethoxysilane methylphenyldiethoxysilane diphenyldiethoxysilane methylethyldiethoxysilane diethyldiphenoxysilane | triethylethoxysilane trimethyethoxysilane triethylphenoxysilane trimethylmethoxysilane |

When the reactants are reacted on a 1:1 molar basis it has been found desirable to employ in admixture with the reactants at least 5% by weight, based on the total weight of the reactants, of an inert solvent that will form an azeotropic mixture with the monohydric alcohol reaction product to insure adequate removal of the monohydric alcohol. Examples of suitable azeotropisers that may be employed are benzene, toluene and xylene. Any azeotropiser remaining in the reaction vessel after the reaction has been completed may be removed by heating under reduced pressure.

In order to produce a strong coordinate bond between the nitrogen and silicon when the reactants are reacted on a 1:1 molar basis, it is desirable to continue refluxing the reactants until all the monohydric alcohol reaction product capable of being formed by the reaction has been removed.

In carrying out the reaction employing two mols of alkanolamine and one mol of organosilicon compound, it is only necessary to proceed with the reaction until at least two mols of the alcohol reaction product are removed. In some cases, the nature of the reactants is such that it is possible to produce more than two mols of the monohydric alcohol reaction product, and the reaction may be further carried out to accomplish this removal.

To illustrate more fully this point, the following example is set forth.

EXAMPLE I

One mol of ethyl orthosilicate and two mols of diethanolamine are placed in a three-neck, one liter flask fitted with a thermometer, stirrer and Dean-Stark trap with condenser. The reactants are heated slowly to reflux and reflux is continued until two mols of ethanol are removed and collected in the Dean-Stark trap. The reaction is stopped at this point and the resulting nitrogen coordinated silicon compound, a liquid at room temperature, has the structural formula

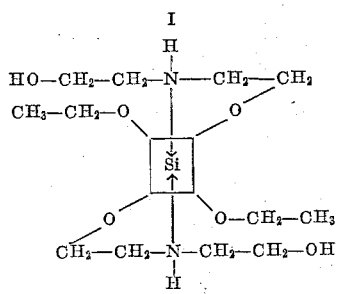

The refluxing may, however, be continued to remove a total of either three mols or four mols of ethanol, and two other reaction products will result. These two products have the following structural formulas

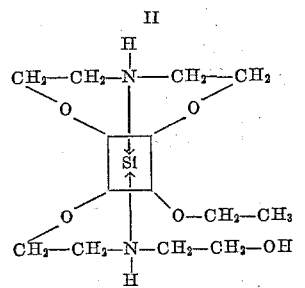

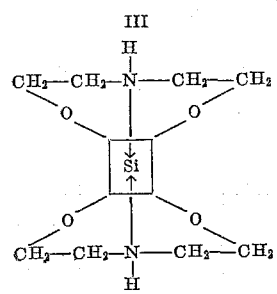

It will be noted that the four ethoxy groups in the silicates will react with two, three or four of the ethanol groups provided by the two mols of diethanolamine in producing products I, II and III respectively.

To illustrate more fully the process of this invention, the following examples are set forth:

EXAMPLE II

The following materials are charged into a three-neck, one liter flask fitted with a thermometer, stirrer and Dean-Stark trap with condenser. The Dean-Stark trap serves to remove the azeotropic mixture from the flask.

Triethanolamine_____ 74.5 grams (0.5 mol).
Phenyltriethoxysilane_____ 120 grams (0.5 mol).
Benzene (azeotropiser)_____ 500 milliliters.

The reactants are admixed thoroughly and heated slowly to reflux. Reflux is continued until substantially all the ethanol, one of the reaction products, is removed by azeotropic distillation. The reaction product remaining in the flask is dissolved in hot benzene and recrystallized therefrom. The recrystallized compound, phenyltriethanolaminesilane, is a white crystalline solid having a melting point of 203.6° C. to 204.2° C. This compound has a strong nitrogen to silicon coordinate bond. This compound has been determined to have the structural formula

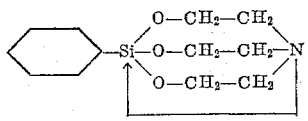

EXAMPLE III

The following ingredients are reacted in apparatus similar to that described in Example I.

Triethanolamine_____ 149 grams (1 mol).
Methyltriethoxysilane_____ 178 grams (1 mol).
Benzene (Azeotropiser)_____ 400 milliliters.

The reactants are thoroughly admixed and heated slowly to reflux. Reflux is continued until substantially all the ethanol, one of the reaction products, is removed by azeotropic distillation. The reaction product remaining in the flask is dissolved in warm benzene and recrystallized. The recrystallized product, methyltriethanolaminesilane, has a melting point of from 139.5° C. to 142° C. This compound may further be purified by sublimation at 60° C./0.8 mm. The structural formula for this compound is

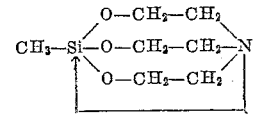

EXAMPLE IV

The following ingredients are reacted in apparatus similar to that used in Example I;

Triethanolamine_____ 149 grams (1 mol).
Ethyl orthosilicate_____ 208 grams (1 mol).
Benzene (Azeotropiser)_____ 400 milliliters.

The reaction product, ethoxytriethanolaminesilane, is a white crystalline solid having a melting point of 35° to 37° C. This compound has a strong nitrogen to silicon coordinate bond and may be represented by the structural formula

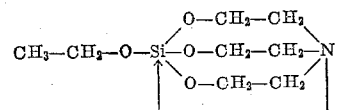

EXAMPLE V

The following ingredients are reacted in apparatus similar to that employed in Example I.

Triethanolamine _____ 298 grams (2 mols).
Ethyl orthosilicate _____ 208 grams (1 mol).

The reactants are thoroughly admixed and heated slowly to reflux. Reflux is continued until four mols of ethanol are distilled off. The reaction product remaining in the flask is a liquid. This reaction product has the structural formula

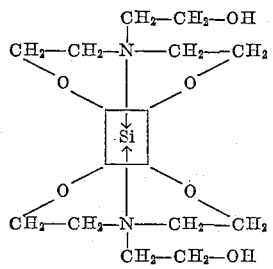

EXAMPLE VI

Employing the apparatus of Example I, the following ingredients are reacted:

N-methyldiethanolamine _____ 119 grams (1 mol).
Ethyl orthosilicate _____ 104 grams (0.5 mol).

The ingredients are thoroughly admixed and heated slowly to reflux. Reflux is continued until 2 mols of ethanol are removed. The reaction product remaining in the flask is a liquid and has the structural formula

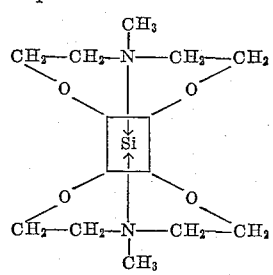

EXAMPLE VII

The following ingredients are charged into a three-neck, one-half liter flask with attachments employed in Example I:

N-methyldiethanolamine _____ 60 grams (0.5 mol).
Diethoxy methylphenylsilane _____ 105 grams (0.5 mol).

The reactants are heated slowly to reflux and refluxed until 1 mol of ethanol is removed. The reaction product remaining in the flask is a liquid and has the structural formula

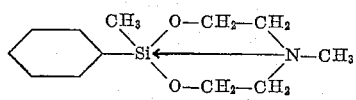

EXAMPLE VIII

The following ingredients are charged into a three-neck, one liter flask fitted with attachments similar to those employed in Example I:

Diisopropanolamine _____ 133.19 grams (1 mol).
Diethoxymethylphenyl silane ___ 210 grams (1 mol).

The ingredients are admixed and heated slowly to reflux. Reflux is continued until two mols of isopropanol are removed. The reaction product remaining in the flask is a liquid and has the structural formula

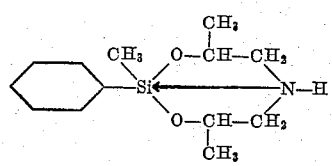

EXAMPLE IX

The following ingredients are charged into a three-neck, one-half liter flask with attachments employed in Example I:

Ethyl orthosilicate _____ 208 grams (1 mol).
N-methyldiethanolamine _____ 120 grams (1 mol).

The reactants are heated slowly to reflux and refluxed until 2 mols of ethanol are removed. The reaction product has the structural formula

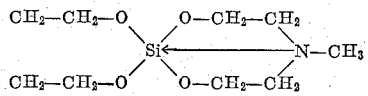

The nitrogen coordinated silicon compounds of this invention may be employed as curing catalysts for epoxy resins and as intermediates for the preparation of other compounds. Thus, 8 parts by weight of the nitrogen coordinated silicon compound of Example VII is added to about 75 parts by weight of an epoxy resin and cured to a thermoset state in about 4 hours when heated to a temperature of about 175° C.

It will be understood that the above examples and description are illustrative and not in limitation of the invention.

I claim as my invention:

1. A nitrogen coordinated silicon compound having the formula

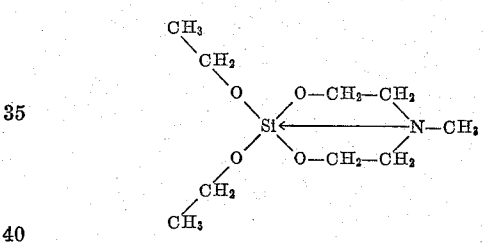

2. A nitrogen coordinated silicon compound having the formula

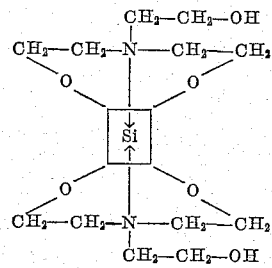

3. A nitrogen coordinated silicon compound having the formula

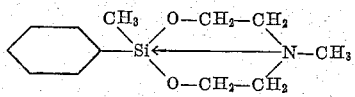

4. A nitrogen coordinated silicon compound having the formula

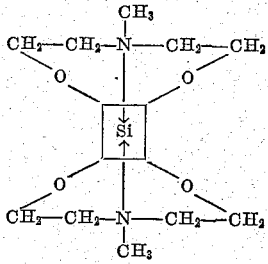

No references cited.